United States Patent [19]

Winkler et al.

[11] 4,103,993

[45] Aug. 1, 1978

[54] MOTION PICTURE CAMERA WITH VARIABLE FOCAL LENGTH LENS

[75] Inventors: Friedrich Winkler, Unterhaching; Anton Theer, Munich; Peter Lermann, Narring; Volkmar Stenzenberger, Unterhaching; Peter Griessner, Munich; Dieter Sandl, Ottobrunn; Hermann Müller, Munich; Herbert Wilsch, Unterhaching, all of Fed. Rep. of Germany

[73] Assignee: AGFA-Gevaert, AG, Leverkusen, Fed. Rep. of Germany

[21] Appl. No.: 719,956

[22] Filed: Sep. 2, 1976

[30] Foreign Application Priority Data

Sep. 11, 1975 [DE] Fed. Rep. of Germany ........ 2540460
Mar. 17, 1976 [DE] Fed. Rep. of Germany ........ 2611230
Mar. 17, 1976 [DE] Fed. Rep. of Germany ........ 2611229
May 14, 1976 [DE] Fed. Rep. of Germany ........ 2621626

[51] Int. Cl.² ............................................. G03B 3/00
[52] U.S. Cl. .................................. 352/140; 354/195; 354/197
[58] Field of Search ............... 352/139, 140; 354/195, 354/197; 350/74, 76, 77, 78, 79

[56] References Cited

U.S. PATENT DOCUMENTS

| 1,317,636 | 9/1919 | Mueller | 352/140 |
| 1,620,768 | 3/1927 | Joy | 352/140 |
| 1,777,257 | 9/1930 | Debrie | 354/197 |
| 2,896,524 | 7/1959 | Warzybok | 352/140 |
| 3,200,699 | 8/1965 | Graves | 352/140 |
| 3,398,666 | 8/1968 | Mamiya | 354/195 |
| 3,668,989 | 6/1972 | Winkler | 352/140 |
| 3,798,670 | 3/1974 | Tanaka | 354/195 |

FOREIGN PATENT DOCUMENTS 3,820,434   1963   Japan ....................... 352/140

*Primary Examiner*—Monroe H. Hayes
*Attorney, Agent, or Firm*—Peter K. Kontler

[57] ABSTRACT

A motion picture camera with variable focal length lens wherein the zooming collar and the distance selecting or focusing collar on the lens barrel are rotatable to neutral positions by an actuating member which is movable at right angles to or in parallelism with the optical axis of the lens. In such neutral positions of the collars, the focal length of the lens is satisfactory for the making of exposures in daylight or artificial light, and the distance setting corresponds to a distance of 4 to 6 meters to thus guarantee an acceptable depth of field for exposures of subjects located anywhere between closeup and infinity. The actuating member can further close a master switch to allow for starting of the camera motor in immediate response to depression of the release trigger.

56 Claims, 15 Drawing Figures

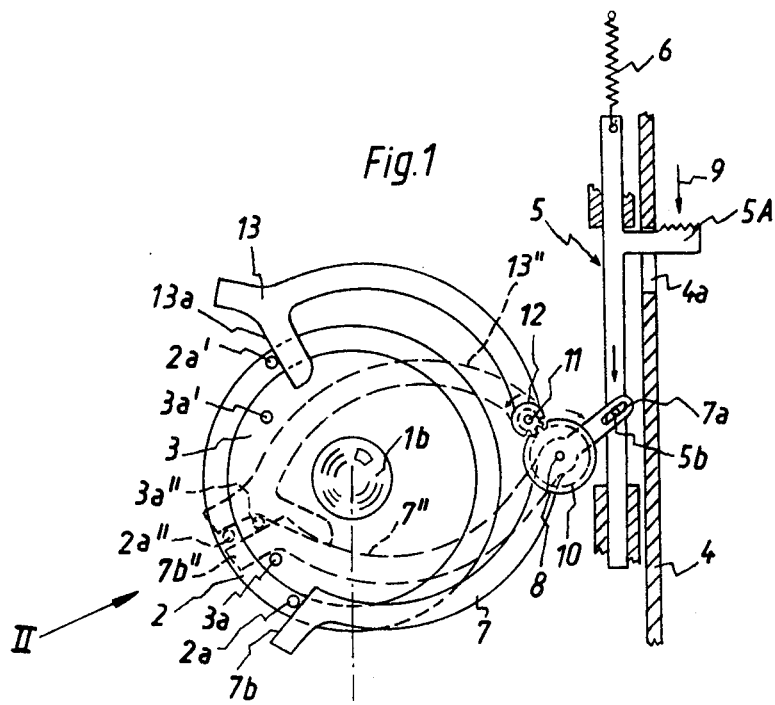
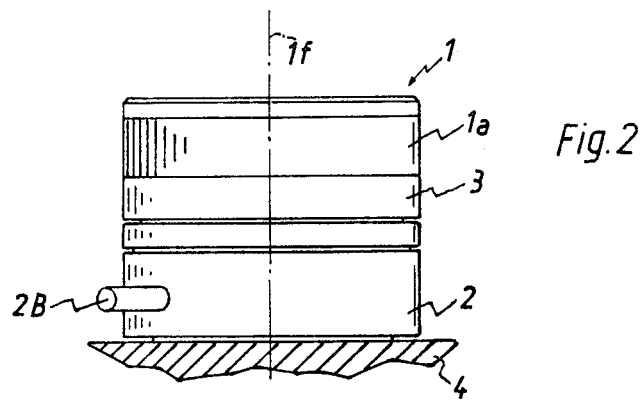

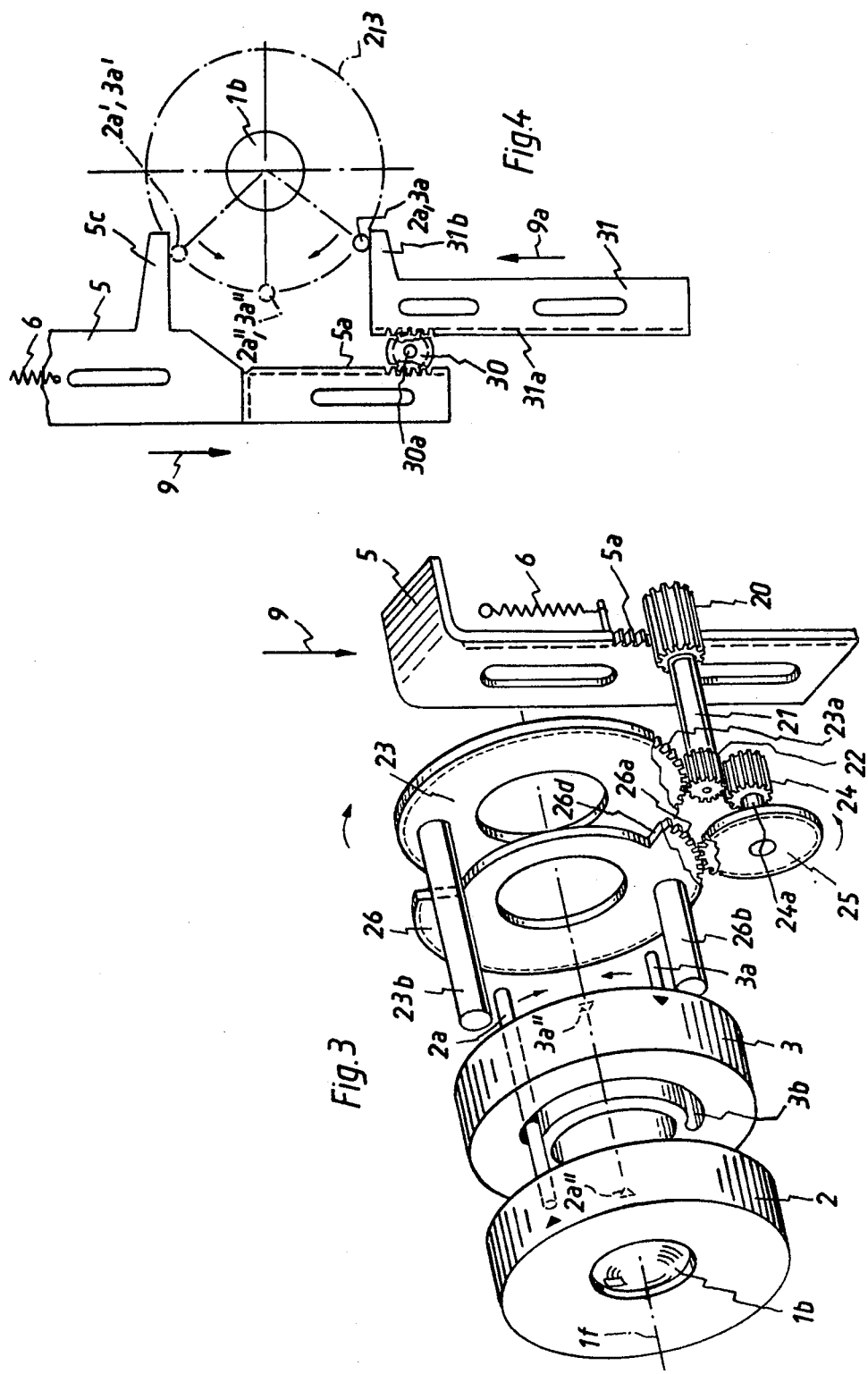

MOTION PICTURE CAMERA WITH VARIABLE FOCAL LENGTH LENS

BACKGROUND OF THE INVENTION

The present invention relates to photographic apparatus in general, and more particularly to improvements in photographic apparatus which are provided with variable focal length (zoom) lenses Still more particularly, the invention relates to improvements in motion picture cameras which are equipped with a plurality of adjusting elements including means for varying the focal length of the lens and means for focusing the lens for a given distance from the subject.

Photographic apparatus which embody the above outlined features can be readily manipulated by skilled photographers. However, if a photographic apparatus having a zoom lens is to be used by several persons, for example by several members of a family, one or more persons are likely to be incapable of properly manipulating one or more adjusing elements whose manipulation is familiar to the other person or persons. Thus, the husband and/or the wife might not encounter any problems in connection with the manipulation of a motion picture camera which is equipped with a zoom lens but the child or children might not be familiar with the purpose and/or best mode of adjusting the zoom lens under different circumstances. This can result in the making of unsatisfactory exposures or is likely to deter one or more members of the family from using the camera. By way of example, a mother is often confronted with a situation where she could make exceptional shots of her children but for the fact that the motion picture camera which can be readily manipulated by the father is too complex for proper manipulation by the mother.

OBJECTS AND SUMMARY OF THE INVENTION

An object of the invention is to provide a photographic apparatus, particularly a motion picture camera having a zoom lens, with novel and improved means for moving one or more adjusting elements (such as a collar which can be rotated on the barrel of the zoom lens to change the focal length of the lens, a collar which can be rotated on the barrel to focus the image of a subject on the foremost unexposed film frame and/or a master switch which must be closed if the camera motor is to be started in response to depression of the release) to one or more predetermined positions in which the manipulation of the camera is simplified without unduly affecting the quality of exposures.

Another object of the invention is to provide a motion picture camera having a zoom lens with novel and improved means for automatically moving the adjusting elements for focal length and focusing to predetermined positions in response to depression, pulling, pushing or pivoting of a single actuating member.

A further object of the invention is to provide a photographic apparatus with simple, compact and inexpensive means for selecting the complexity of manipulation of the apparatus during the making of exposures in daylight and/or artificial light.

An additional object of the invention is to provide a novel and improved motion picture camera whose versatility is just as satisfactory as the versatility of other advanced motion picture cameras with zoom lenses but which can be rapidly converted into a camera suitable for manipulation by novices or unskilled photographers while at the same time permitting such novices or unskilled photographers to make satisfactory exposures in daylight or artificial light.

A further object of the invention is to provide novel and improved means for adjusting the focal length of the lens and/or for focusing the images of subjects in a motion picture camera which is equipped with a variable focal length lens.

An ancillary object of the invention is to provide a motion picture camera, particularly a camera for use with 8-millimeter film, wherein the installation of means for moving one, two or more adjusting elements to predetermined positions preparatory to entrusting the camera to a novice or unskilled photographer does not contribute to the bulk, cost and/or weight of the camera.

Another object of the invention is to provide a motion picture camera wherein the ease of selection of focal length and/or focusing at any selected distance from the subject is not affected by the provision of means for moving the adjusting elements for focal length and focusing to predetermined positions preparatory to entrusting the camera to an unskilled photographer.

A further object of the invention is to provide a motion picture camera wherein the focal length can be selected so as to be suited for the making of acceptable exposures by a person who is not famililar wiith the purpose and functioning of a zoom lens and/or with the purpose of and mode of manipulating the focusing means.

An additional object of the invention is to provide a photographic apparatus wherein at least two adjusting elements, especially adjusting elements of the type normally mounted on the barrel of a zoom lens, can be simultaneously shifted to one or more predetermined positions in which the apparatus can be entrusted to persons who are totally unfamiliar with the art of photography except for the elementary knowledge that it is necessary to see a selected subject in the view finder and that an exposure can be made by depressing or otherwise actuating the camera release.

The invention is embodied in a photographic apparatus, particularly in a motion picture camera (preferably for use with 8-millimeter film), which comprises a variable-focal-length lens (i.e., a so-called zoom lens), a rotary collar or analogous adjusting means movable between a plurality of positions each corresponding to a different focal length of the lens whereby such positions include at least one neutral position corresponding to a predetermined focal length (preferably a focal length which is satisfactory for the making of exposures in daylight or artificial light), a wheel, a slide or analogous actuating means which is movable (preferably by hand) between operative and inoperative positions, and one or more levers, disks, cables or other suitable motion transmitting means for moving or effecting the movement of adjusting means to neutral position in response to movement of actuating means between operative and inoperative positions, irrespective of the position of adjusting means prior to such movement of the actuating means (of course, the adjusting means simply remains in neutral position if it has assumed the neutral position prior to movement of actuating means between operative and inoperative positions).

In accordance with a presently preferred embodiment of the invention, the photographic apparatus further comprises at least one additional adjusting means (e.g., a focusing collar on the barrel of the zoom lens) which is also movable between a plurality of positions including at least one neutral position, and the motion transmitting means is preferably constructed and assembled in such a way that the additional adjusting means is moved to neutral position simultaneously with the first mentioned adjusting means whenever the actuating means is moved between operative and inoperative positions.

The actuating means can be a rotary wheel, a rotary disk, a reciprocable slide, a reciprocable pusher or a pivotable lever which is movable between operative and inoperative positions at right angles to the optical axis of the zoom lens, a device which is movable in parallelism with the optical axis, or a device which must perform a more complex movement during shifting between operative and inoperative positions.

The neutral position of the one and/or the other adjusting means may be an end position or an intermediate position of the respective adjusting means.

The actuating means may further serve to automatically close a master switch in a motion picture camera wherein the film transporting mechanism and/or the zoom lens receives motion from an electric motor so that the camera is ready for the making of exposures as soon as the adjusting means assumes or assume the neutral position(s).

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic front elevational view of a portion of a photographic apparatus with a zoom lens which embodies the invention, the adjusting elements on the barrel of the zoom lens being movable to neutral positions by two levers and being shown in two end positions as well as in their neutral positions;

FIG. 2 is a side elevational view of the zoom lens, substantially as seen in the direction of arrow II in FIG. 1;

FIG. 3 is an exploded perspective view of a portion of a modified zoom lens wherein the adjusting elements are movable to neutral positions by means of disk-shaped rotary motion transmitting members;

FIG. 4 is a partly schematic front elevational view of a third zoom lens wherein the adjusting elements are movable to neutral positions by two slides one of which constitutes the actuating means;

DESCRIPTION OF THE PREFERRED EMBODIMENTS

Figure 5:
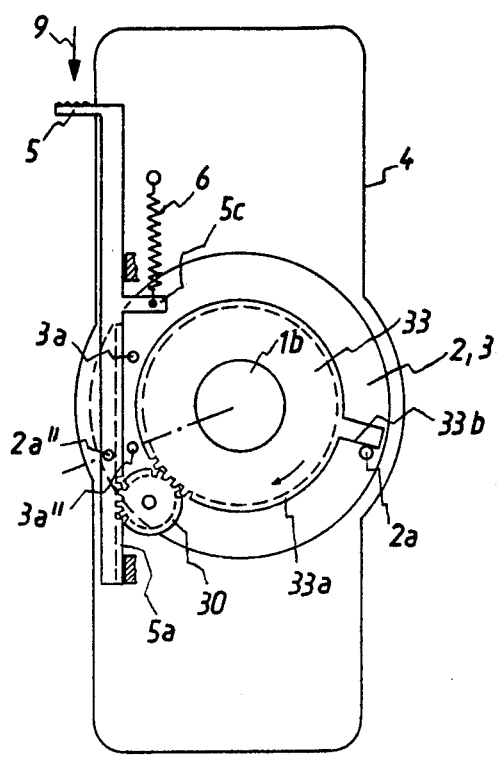
FIG. 5 is a front elevational view of a motion picture camera with a zoom lens wherein the adjusting elements are movable to neutral positions by the actuating means and by a disk-shaped rotary motion transmitting member.

Referring to FIGS. 1 and 2, there is shown a portion of a motion picture camera which comprises a zoom lens 1 including a barrel 1a for optical elements 1b, a first adjusting element 2 which is a focusing collar rotatably mounted on the barrel 1a of the lens 1 and having a motion receiving projection or pin 2a, and a second adjusting element 3 which is a zooming collar rotatably mounted on the barrel of the lens 1 and having a motion receiving projection or pin 3a. The collars 2 and 3 are rotatable between two end positions (in which their projections 2a, 3a respectively assume the positions shown at 2a, 3a and the positions 2a', 3a') and through a plurality of intermediate positions, including those which are indicated at 2a'', 3a''. For example, the positions 2a, 3a may correspond to those of proper focusing at a maximum distance from the subject and of maximum focal length, the positions 2a' and 3a' may correspond to those of proper focusing at a minimum distance from the subject and of minimum focal length, and the positions 2a'', 3a'' may represent proper focusing at a median distance (e.g., 5 meters) from the subject and a medium focal length. The projections 2a, 3a should assume the positions 2a'' and 3a'' (hereinafter called neutral positions) when the camera is to be manipulated by a novice or by an unskilled amateur photographer, i.e., when the person manipulating the camera should be able to make exposures without any adjustment of the collars 2 and 3. The neutral positions 2a'', 3a'' can be readily selected in such a way that a person using the camera is capable of making satisfactory exposures in daylight whereby the depth of field is acceptable irrespective of the distance of lens 1 from the subject (such distance may include closeup or infinity) as well as of making acceptable shots in artificial light.

In accordance with the invention, the camera of FIGS. 1 and 2 comprises means for rapidly moving the collars 2 and 3 to such positions in which their projections 2a, 3a respectively assume the neutral positions 2a'' and 3a''. To this end, the housing or body 4 of the camera supports a reciprocable actuating member or slide 5 which is biased by a helical spring 6 to normally assume the first or inoperative position of FIG. 1 and which is movable by hand (see the arrow 9) against the opposition of spring 6 to thereby pivot two motion transmitting levers 7 and 13. The lever 7 is pivotably mounted on a fixed shaft 8 and its shorter arm has an elongated slot 7a for a pin 5b of the slide 5. When the slide 5 is pushed or pulled in the direction indicated by arrow 9, the pin 5b pivots the lever 7 clockwise, as viewed in FIG. 1, and causes an outwardly extending entraining lug 7b at the free end of the longer arm of the lever 7 to move toward the position 7b". The projections 2a, 3a of the collars 2 and 3 are located in the path of movement of the lug 7b (if the angular positions of the collars 2, 3 are such that their projections 2a, 3a are located between the positions shown at 2a, 3a and the positions 2a", 3a") whereby the lug 7b automatically entrains the projections toward the positions 2a", 3a". The shaft 8 carries a gear 10 which shares the angular movements of the lever 7 under or against the bias of the spring 6 and meshes with a smaller second gear 12 on a fixed shaft 11. The gear 12 pivots the lever 13 which has an entraining lug 13a adapted to move the projections 2a, 3a from the positions 2a', 3a' to the positions 2a", 3a" if the projections 2a, 3a happen to be located between the positions 2a', 3a' and 2a", 3a" when the user of the camera moves the slide 5 in the direction indicated by arrow 9.

The projections 2a and 3a are assumed to be in the positions shown at 2a, 3a when the user of the camera wishes to rotate the collars 2, 3 to their neutral positions. The user simply moves (pushes or pulls) the slide 5 in the direction of arrow 9 whereby the spring 6 stores energy and the lever 7 is pivoted clockwise, as viewed in FIG. 1, to move to the position 7". At the same time, the lever 7 causes the gears 10 and 12 to pivot the lever 13 anticlockwise, as viewed in FIG. 1, whereby the lever 13 moves to the position 13". During such movement, the lug 13a does not engage the projections 2a, 3a; however, the lug 7b entrains these projections from the positions shown at 2a, 3a to the neutral positions 2a", 3a". If the projections 2a, 3a assume the positions 2a", 3a" prior to movement of the slide 5 from inoperative position, the angular positions of the collars 2 and 3 remain unchanged. If the projections 2a, 3a assume the positions 2a', 3a' (or any positions between those shown at 2a', 3a' and 2a", 3a") prior to movement of the slide 5, the collars 2, 3 are rotated by the lug 13a when the slide 5 is moved against the opposition of the spring 6. It will be seen that the levers 7 and 13 effect a movement of projections 2a, 3a to the neutral positions 2a", 3a" whenever the slide 5 is moved from the inoperative position of FIG. 1 to the second or operative position. The extent of such movement of the slide 5 is determined by the length of a slot 4a in the housing or body 4 of the motion picture camera. The major part of the slide 5 is concealed in the interior of the body 4, and this slide has a preferably serrated or knurled arm or extension 5A which extends outwardly through the slot 4a.

When the spring 6 is free to retract the slide 5 to the inoperative position of FIG. 1, the levers 7 and 13 reassume their solid-line positions; however, the collars 2 and 3 remain in those positions which correspond to neutral positions of their projections 2a and 3a. Friction between the barrel 1a of the lens 1 and the collars 2, 3 is sufficient to normally prevent uncontrolled angular displacements of these collars except under the action of the entraining lug 7b and/or 13a, as well as when the user intentionally changes the angular positions of the collars. FIG. 2 shows a radially outwardly extending handle 2B which can be used by the operator to change the angular position of the collar 2. A similar handle or zoom bar (not shown) is provided on the collar 3 so that the operator can change the focal length of the lens 1 when the slide 5 dwells in the inoperative position of FIG. 1.

The levers 7, 13 and the projections 2a, 3a can be installed in the interior of the barrel 1a and the projections 2a, 3a are parallel or substantially parallel to the optical axis 1f of the lens 1.

FIGS. 3, 4 and 5 illustrate portions of slightly modified cameras wherein the motion transmitting levers 7 and 13 are replaced with substantially disk-shaped rotary motion transmitting members. All such parts of the cameras of FIGS. 3 to 5 which are identical with or clearly analogous to corresponding parts of the camera shown in FIGS. 1 and 2 are denoted by similar reference characters.

Referring first to FIG. 3, the barrel for the optical elements 1b has been omitted for the sake of clarity. The motion receiving projections or pins 2a, 3a of the collars 2, 3 extend in parallelism with the optical axis 1f of the zoom lens and the collar 3 has an arcuate slot 3b for the projection 2a. The neutral positions of the projections 2a, 3a are respectively shown at 2a", 3a". The actuating member or slide 5 is reciprocable in and counter to the direction indicated by arrow 9, i.e., substantially at right angles to the optical axis 1f (the same as in the embodiment of FIGS. 1 and 2). A helical return spring 6 biases the slide 5 to the first or inoperative position of FIG. 3. The slide 5 has a toothed rack 5a which meshes with a gear 20 on a shaft 21 which is journalled in the housing or body (not shown) of the motion picture camera. The shaft 21 is rigid with a smaller second gear 22 which meshes with the ring gear 23a of a disk-shaped rotary motion transmitting member 23. The latter (hereinafter called disk for short) is rotatable in the barrel of the zoom lens about the optical axis 1f and has an entraining projection or stud 23b which is a functional equivalent of the lug 7a shown in FIG. 1. The gear 22 is further in mesh with a gear 24 on a shaft 24a which is journalled in the camera body and carries an additional gear 25 in mesh with a gear segment 26a of a second disk-shaped rotary motion transmitting member 26 (hereinafter called disk) which is coaxial with the disk 23. The disk 26 has an arcuate cutout 26d for the stud 23b of the disk 23 and the disk 26 carries a second entraining projection or stud 26b which is a functional equivalent of the lug 13a shown in FIG. 1.

When the slide 5 is moved against the opposition of the spring 6 (see the arrow 9), the disks 23, 26 rotate in opposite directions and cause their studs 23b, 26b to entrain the projections 2a, 3a to the neutral positions 2a", 3a" regardless of the angular positions of collars 2 and 3 prior to movement of the slide 5 from the inoperative position of FIG. 3 (except, of course, if the projection 2a and/or 3a already dwells in the neutral position). The diameters of the studs 23b, 26b are large enough to insure that each of these studs can entrain the projection 2a and/or 3a. When the spring 6 is free to contract, the slide 5 reassumes its inoperative position but the collars 2 and 3 remain in the angular positions corresponding to neutral positions 2a", 3a" of their projections 2a and 3a. The handles (corresponding to the handle 2B of FIG. 2) which are used to change the angular positions of collars 2 and 3 in the inopertive position of the slide 5 are not shown in FIG. 3. If desired, the motion picture camera which embodies the structure of FIG. 3 can be equipped with a motor which serves to change the angular position of the zooming collar 3 in the inoperative position of the slide 5.

FIG. 4 shows that the slide 5 has a motion transmitting arm 5c which can directly engage and entrain the motion receiving projections 2a, 3a of the collars 2, 3 from the end positions 2a', 3a' to the neutral positions 2a'', 3a''. The slide 5 has a toothed rack 5a in mesh with a gear 30 which is rotatable about the axis of a fixed shaft 30a and is in mesh with the toothed rack 31a of a second slide 31 which is movable in parallelism with the slide 5. When the slide 5 moves in the direction indicated by arrow 9 to stress the spring 6, the slide 31 moves in the direction of arrow 9a and its arm 31b can entrain the projection 2a and/or 3a from the end position shown at 2a, 3a to the neutral position 2a'', 3a''. It will be noted that the slides 5 and 31 move in the opposite directions and that their arms 5c, 31b are normally adjacent to the projections 2a, 3a when these projections respectively assume the end positions shown at 2a, 3a and the end positions 2a'', 3a''. The spring 6 is strong enough to retract the slide 5 to the inoperative position of FIG. 4 and to simultaneously move the slide 31 to the illustrated position. It is clear, however, that the structure of FIG. 4 may comprise an additional spring for the slide 31 or a single spring which biases the slide 31.

FIG. 5 shows a modification of the camera of FIG. 4. The second slide 31 of FIG. 4 is replaced with a rotary disk 33 having a ring gear 33a in mesh with the gear 30. The latter is rotated by the slide 5 in the same way as described in connection with FIG. 4. The arm 33b of the disk 33 is the functional equivalent of the entraining arm 31b. When the slide 5 is caused to leave the inoperative position of FIG. 5, the arms 5c, 33b move toward each other whereby the arm 5c and/or the arm 33b entrains the motion receiving projection 2a and/or 3a and moves it to the neutral position (2a'', 3a'').

The directions of movement of the slides 5 shown in FIGS. 4 and 5 are normal to the optical axis of the optical elements 1b, the same as in FIG. 3.

A feature which is shared by all of the embodiments shown in FIGS. 1-2, 3, 4 and 5 is that the motion transmitting members 7, 13 or 23, 26 or 5c, 31b or 5c, 33b move in opposite directions in response to movement of the actuating member 5 from its inoperative position. Thus, such motion transmitting members sweep the entire area where the motion receiving projections 2a, 3a can dwell at the time the user decides to move the collars 2, 3 to their neutral positions. The motion transmitting members thereupon reassume their starting or retracted positions to provide room for eventual movement of the collar 2 and/or 3 from the neutral position so that a person who wishes to change the focal length of the optical elements 1b (by means of the collar 3) or to focus the image of a subject on the foremost unexposed film frame can immediately proceed with turning of the collar 2 and/or 3 without renewed shifting of the actuating member 5.

Figure 6:
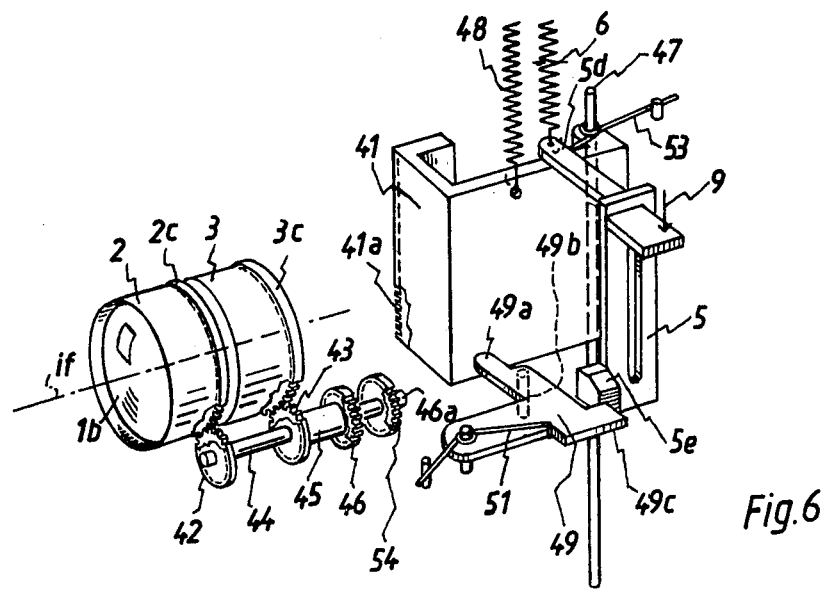
FIG. 6 is a perspective view of a further embodiment wherein the adjusting elements can be moved to several neutral positions, the actuating means for toothed motion transmitting position; being shown in the inoperative positions.
Figure 7:
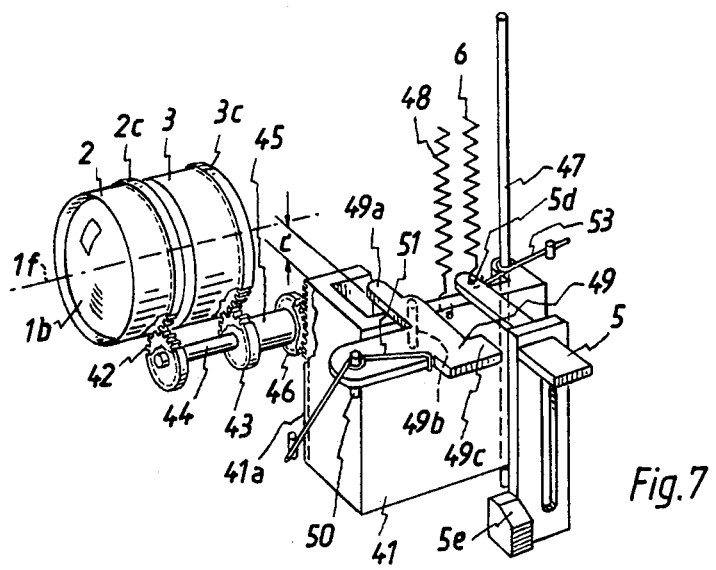
FIG. 7 shows the structure of FIG. 6 but with the actuating means in operative position.

FIGS. 6 and 7 show a modified camera which comprises means for selecting any one of several neutral positions for the collars 2 and 3 on the lens barrel for the optical elements 1b. The collars 2 and 3 respectively comprise motion receiving ring gears 2c, 3c which respectively mesh with first and second gears 42, 43. The gears 42, 43 are respectively rigid with coaxial shafts 44, 45, and the shaft 44 is telescoped into the shaft 45. A friction clutch of any known design (not specifically shown) is interposed between the shafts 44 and 45 so that the gears 42, 43 normally rotate in unison but the gear 42 or 43 is rotatable relative to the gear 43 or 42 when the respective collar reaches an end position in which the associated motion receiving ring gear is held against further rotation. The shaft 45 for the gear 43 surrounds a coaxial third shaft 46a which is rigid with a third gear 46. A second friction clutch (not shown) is interposed between the shafts 45 and 46a. The gear 46 is assumed to rotate clockwise, as viewed in FIG. 6, when engaged by the toothed rack 41a of a reciprocable and pivotable driving member 41. The latter is reciprocable in parallelism with the actuating member of slide 5 and is pivotable about the axis of a shaft 47 which is parallel to the rack 41a and whose axis is normal to the common axis of the shafts 44, 45, 46a and to the optical axis 1f of the zoom lens. When the driving member 41 is pivoted anticlockwise, as viewed in FIG. 6 or 7, its rack 41a is disengaged from the third gear 46. A helical spring 48 biases the driving member 41 upwardly, as viewed in FIG. 6 or 7, i.e., this spring tends to move the member 41 lengthwise of the shaft 47 in a direction counter to that indicated by the arrow 9.

The slide 5 has an arm 5d which overlies the upper end face of the driving member 41, and the slide 5 further comprises a suitably inclined cam 5e which can be engaged by the follower arm 49c of a coupling lever 49 pivotably mounted on a shaft 50 which is parallel to the shaft 47. The lever 49 further comprises an arm 49a and a pin 49b, both movable into engagement with the driving member 41. The portions 49a and 49b of the coupling lever 49 can engage the driving member 41 in such a way that the latter maintains the teeth of its rack 41a in mesh with the teeth of the gear 46. The means for biasing the coupling lever 49 in such direction comprises a torsion spring 51 which is coiled around the shaft 50, one leg of which engages a fixed retainer and the other leg of which bears against an edge face of the lever 49. The torsion spring 51 can be replaced with other biasing means which pushes or pulls the coupling lever 49 in a direction to maintain the portions 49a, 49b in engagement with the driving member 41.

When the slide 5 is moved in the direction indicated by arrow 9, the arm 5d moves the driving member 41 in the same direction whereby the rack 41a rotates the gear 46 and the gear 46 rotates the gears 42, 43 and collars 2, 3. The extent of movement of the driving member 41 with the slide 5 is selected in such a way that the motion receiving gears 2c, 3c can rotate the collars 2, 3 from first end positions (e.g., corresponding to the end positions 2a', 3a' of the projections 2a, 3a shown in FIG. 1) to second end positions corresponding to the other end positions of the projections 2a, 3a). In other words, when the slide 5 reaches its operative position, each of the collars 2, 3 invariably reaches an end position (rather than a neutral position as in the embodiments of FIGS. 1-2, 3, 4 and 5). Thus, such movement of the slide 5 invariably insures that the collars 2, 3 rotate in unison toward one of their end positions. The clutch between the shafts 44, 45 allows the gear 42 to rotate relative to the gear 43 (or vice versa) if the collar 2 reaches the selected end position ahead of the collar 3 (and vice versa). The clutch between the shafts 45 and 46a allows the shaft 46a to rotate relative to the shafts 44, 45 if both collars reach the selected end positions before the slide 5 reaches its operative position.

When the upper end face of the driving member 41 moves below the plane of the coupling lever 49, the torsion spring 51 can pivot the lever 49 clockwise, as viewed in FIG. 7, so that the arm 49a moves above the driving member 41 and thus extends into the path of return movement of the member 41 under the action of the spring 48. When the slide 5 reaches its operative (lower end) position, the upper end face of the driving member 41 is spaced apart from and is located below the arm 49a (see the distance c in FIG. 7). The rack 41a remains in mesh while with the gear 46 because the driving member 41 is still engaged by the pin 49b of the coupling lever 49.

The user of the camera thereupon releases the slide 5 so that the spring 6 is free to contract and to move the slide upwardly, as viewed in FIG. 6 or 7. The driving member 41 can share the initial stage of such movement of the slide 5 because it is biased by the spring 48; however, the member 41 is arrested by the arm 49a as soon as it covers the distance c. During movement counter to the direction indicated by the arrow 9, the rack 41a rotates the gear 46 in a counterclockwise direction whereby the gears 46, 43, 42, 3c and 2c rotate in unison and move the collars 2, 3 to their netural positions (corresponding to the positions 2a", 3a" of the projections 2a, 3a shown in FIG. 1). The slide 5 continues to move upwardly under the action of the spring 6 (i.e., the slide 5 moves relative to the driving member 41 which is held by the arm 49a of the coupling lever 49) whereby the cam 5e engages the follower arm 49c and pivots the lever 49 anticlockwise. This disengages the portions 49a, 49b of the lever 49 from the driving member 41 so that the latter is free to pivot on the shaft 47 (anticlockwise, as viewed in FIG. 6 or 7), under the action of a torsion spring 53 which disengages the rack 41a from the gear 46. The spring 48 is free to return the driving member 41 to the upper end position whereby the angular position of the gear 46 remains unchanged because this gear is not in mesh with the rack 41a. When the slide 5 reaches its inoperative position, the cam 5e is located at a level above the follower arm 49c and the coupling lever 49 is free to assume the position shown in FIG. 6 in which the camera can be used for the making of exposures with a lens of average focal length and with the focusing collar 2 in a neutral position in which the image of a subject located at an averge distance from the optical elements 1b (e.g., at a distance of 5 meters) is sharply focussed on the foremost unexposed frame of photographic film (e.g., 8-millimeter film) in the body of the motion picture camera.

The handles (not shown) enable a skilled photographer to change the angular positions of the collars 2, 3 when the slide 5 dwells in the inoperative position of FIG. 6.

Figure 8:
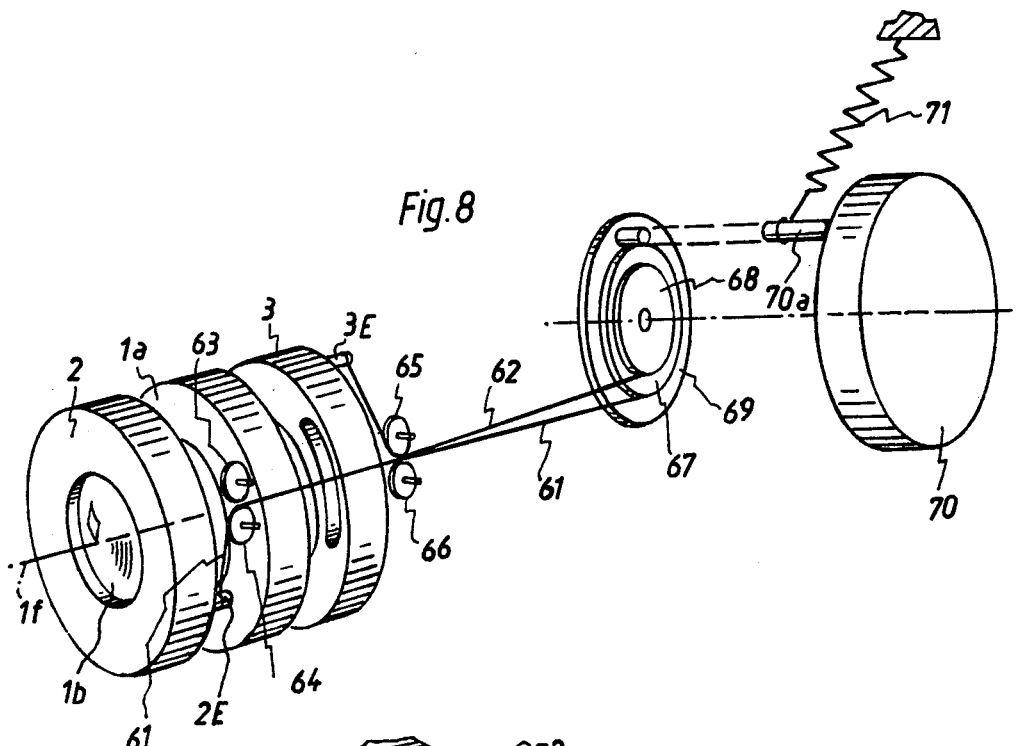
FIG. 8 is a fragmentary perspective view of a further zoom lens wherein the adjusting elements are movable to neutral positions by way of flexible motion transmitting elements.

The purpose of the gear 54 on the shaft 46a is to allow for selection of different neutral positions for the collars 2, 3. Thus, all that is necessary to change from one pair of neutral positions to another pair of neutral positions is to move the rack 41a of the driving member 41 from mesh with the gear 46 into mesh with the gear 54 or vice versa. This can be achieved by moving the driving member 41 relative to the gears 46, 54 or by moving the shaft 46a for the gears 46, 54 relative to the driving member. The number of teeth on the gear 54 is greater or less than the number of teeth on the gear 46 so that the angular displacement of collars 2, 3 when the driving member moves upwardly to cover the distance c, is different when the rack 41a meshes with the gear 46 than when the rack 41a meshes with the gear 54. For example, the gear 46 may be used to move the collars 2, 3 to first neutral positions which are best suited for the making of exposures in daylight and at a first distance (e.g., 5 or 6 meters) from the subject, and the gear 54 may be used to move the collars 2, 3 to second neutral positions (in which the lens can be located at a distance of 4 meters from the subject) when the camera is to be used for the making of exposures in artificial light. The focal length of the lens is preferably less when the camera is to make exposures with flash. 1a, FIG. 8 shows a portion of a motion picture camera wherein the angular positions of collars 2 and 3 can be changed by cords, cables or analogous flexible motion transmitting members 61, 62. The collars 2 and 3 are respectively provided with motion receiving posts or studs 2E, 3E and the forward ends of the motion transmitting members 61, 62 (hereinafter called cables for short) are secured to the respective posts. The cable 61 passes through the nip of two guide rolls 63, 64 which are mounted in the barrel 1a, and the cable 62 passes through the nip of two guide rolls 65, 66 which are mounted in the barrel 1a or in the body of the motion picture camera. The collar 2 assumes its neutral position when the portion of the cable 61 between the motion receiving post 2E and the nip of the guide rolls 63, 64 is parallel to the optical axis 1f, and the collar 3 assumes the neutral position when the portion of the cable 62 between the motion receiving post 3E and the nip of the guide rolls 65, 66 is parallel to the axis 1f. The rear ends of the cables 61, 62 are respectively secured to the peripheries of two rotary members or pulleys 67, 68 which are coaxial with a rotary driver disk 69. Suitable one-way friction clutches (not specifically shown) are interposed between the rotary members 67, 68 and 68, 69 so that the pulleys 67, 68 normally share the anticlockwise movements of the disk 69 but the latter is free to rotate clockwise with respect to both pulleys. The disk 69 can be rotated clockwise or anticlockwise by a wheel-shaped actuating member 70 through the medium of a rod 70a. The wheel 70 is biased clockwise, as viewed in FIG. 8, by a helical spring 71 which tends to maintain the wheel in the inoperative position. Each of the cables 61, 62 may comprise an elastic portion which enables the respective cable to change its length (within certain limits).

When the user of the camera wishes to change the angular position of the collar 2 and/or 3, the respective collar is rotated by hand (e.g., by resorting to a suitable handle corresponding to the member 2B of FIG. 2) whereby the pulley 67 rotates relative to the pulley 68 and disk 69, the pulley 68 rotates relative to the pulley 67 and disk 69, or the pulleys 67, 68 rotate (with or relative to each other) with respect to the disk 69. If the user wishes to move the collars 2 and 3 to their neutral positions, the wheel 70 is rotated counterclockwise to stress the spring 71 and entrains the disk 69 in the same direction. The disk 69 rotates the pulley 67 and/or 68 through the medium of the respective one-way clutch(es) until the collars 2, 3 reach their neutral positions. The wheel 70 is thereupon released so that the spring 71 contracts and returns the members 69, 70 to their inoperative positions. The one-way clutches allow the disk 69 to rotate with respect to the pulleys 67, 68 so that the collars 2, 3 remain in their neutral positions.

Figure 9:
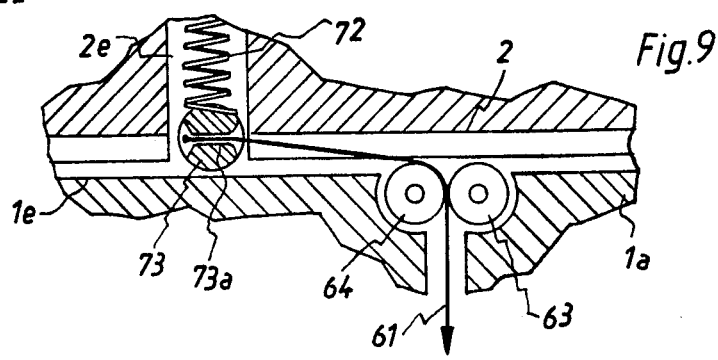
FIG. 9 is an enlarged sectional view of a slight modification of the zoom lens of FIG. 8.
Figure 10:
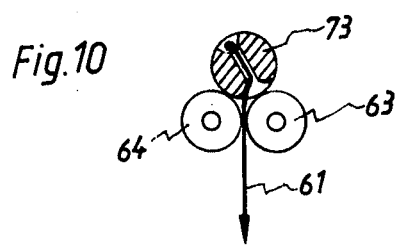
FIG. 10 is a smaller-scale view of certain component parts in the stucture of FIG. 9.

If the motion receiving posts 2E, 3E are replaced with spherical motion receiving elements (such as the spherical element 73 of FIG. 9 which has a diametrically extending slot 73a for the front end of the cable 61), and the spherical elements 73 are biased by springs (see the spring 72 which biases the element 73 toward the adjacent end face or shoulder 1e of the barrel 1a), the element 73 snaps between the guide rolls 63, 64 when the collar 2 reaches its neutral position (see FIG. 10) and the collar then remains in such neutral position until and unless it is subjected to torque of a magnitude which is needed to expel the spherical element 73 from the space between the rolls 63, 64. The spherical element 73 is movable in a bore 2e which is machined into the collar 2 and is parallel to the optical axis 1f. This spherical element cooperates with the rolls 53, 64 to constitute therewith a detent which yieldably holds the collar 2 in neutral position. An advantage of such detent is that the movements of the collar 2 to neutral position are reproducible with a maximum degree of accuracy, especially if the cable 61 comprises an elastic portion. The spherical element (not shown) for the front end of the cable 62 is analogous to the element 73.

Figure 11:
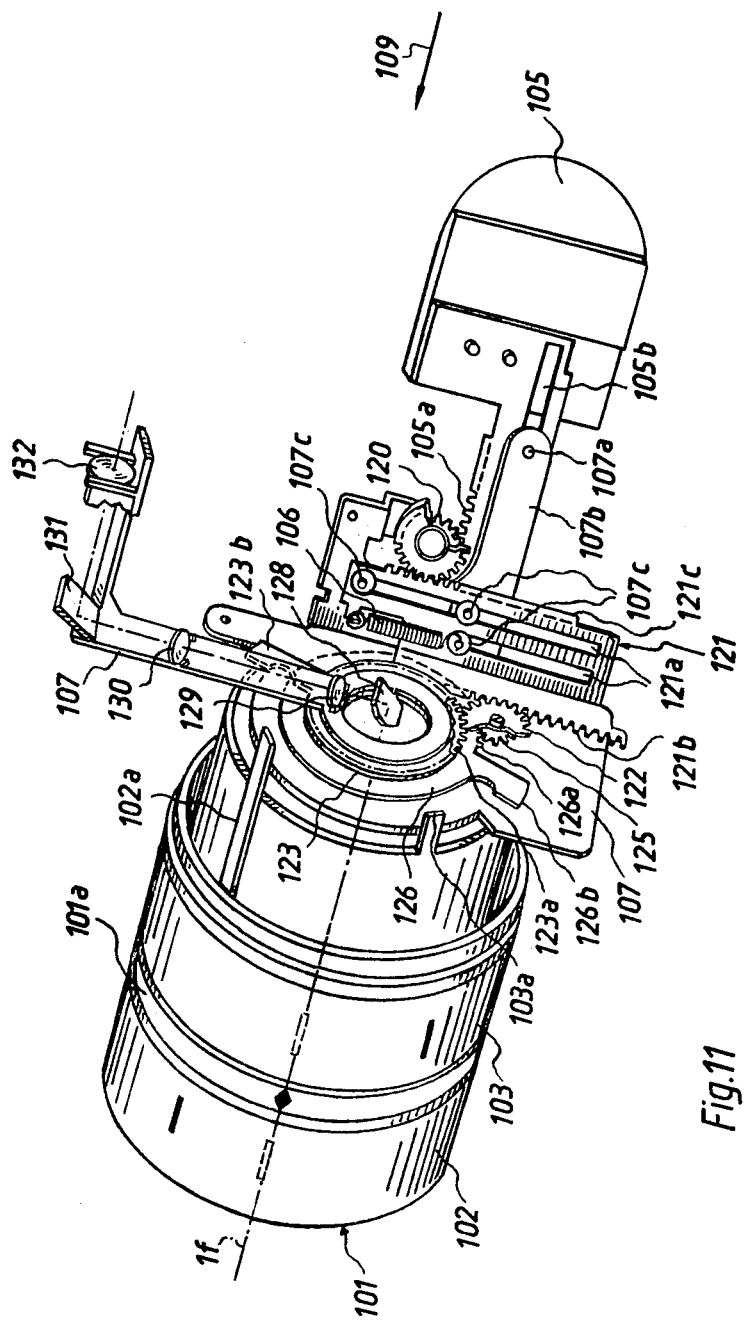
FIG. 11 is a perspective view of a zoom lens wherein the adjusting elements are movable to neutral positions by an actuating means which is movable in parallelism with the optical axis of the lens.

Referring to FIG. 11, there is shown a portion of a motion picture camera wherein the zoom lens 101 comprises collars 102, 103 (respectively corresponding to aforedescribed collars 2, 3) which are rotatable about the optical axis 1f and can move to neutral positions in response to movement of an actuating member or slide 105 from the inoperative position of FIG. 11. In accordance with a feature of this camera, the slide 105 is reciprocable in and counter to the direction indicated by arrow 109, i.e., by moving in parallelism with the optical axis 1f. This is desirable and advantageous because the slide can be pushed against the opposition of a return spring 106 by the thumb of an operator so that the remaining fingers of the same hand can be used to manipulate other components of the motion picture camera.

The collars 102, 103 respectively comprise motion receiving projections 102a, 103a which correspond to the projections 2a, 3a of FIG. 1 and extend in parallelism with the optical axis 1f. FIG. 11 shows the collars 102, 103 and their projections 102a, 103a in intermediate positions (but not in those intermediate positions which constitute the neutral positions). In the neutral position of the collar 2, the lens is properly focused upon a subject which is located at an average distance (e.g., 5 meters) from the camera. The focal length of optical elements in the barrel 101a of the zoom lens 101 is an average focal length. This insures that, if the exposures are made in satisfactory daylight, the depth of field is acceptable in the entire range of distances including infinity. Also, the neutral positions can be selected in such a way that the camera can make satisfactory exposures in artificial light.

The slide 105 has an elongated slot 105b for a pin 107a on a rearwardly extending arm 107b of a plate-like support 107 which is mounted on the barrel 101a. The slide 105 further includes an elongated toothed rack 105a in mesh with a gear 120 which meshes with a toothed rack 121c forming part of a slide 121 which is movable at right angles to the direction indicated by arrow 109. The gear 120 is mounted on an arm of the support 107. The slide 121 has elongated slots 121a for guide pins 107c of the support 107 and includes a second toothed rack 121b which is in mesh with a gear 122 rotatably mounted on the support 107. The gear 122 is coaxial and rigid with a gear 125 and meshes with a ring gear 123a forming part of a disk-shaped rotary motion transmitting member 123. The gear 125 meshes with the ring gear 126a of a second disk-shaped rotary motion transmitting member 126 which is coaxial with the disk 123. The disks 123, 126 respectively comprise entraining lugs 123b, 126b which correspond to the lugs 7b, 13a of the levers 7, 13 shown in FIG. 1. Thus, the lugs 123b, 126b can move through sufficient angular distances to insure that they entrain the motion receiving projections 102a, 103a and move the collars 102, 103 to neutral positions not later than when the slide 105 reaches its operative (depressed) position. The gear 125 is smaller than the gear 122 so that the disks 123, 126 rotate relative to each other when the slide 105 is moved forwardly (arrow 109). If desired, the camera of FIG. 11 may comprise means for rotating the gear 125 clockwise in response to anticlockwise rotation of the gear 122 or vice versa; this renders the structure of FIG. 11 even more similar to the structure of FIG. 1.

When the pressure upon the slide 105 is relaxed so that the spring 106 is free to move the slide 121 downwardly (as viewed in FIG. 11) and to thereby move the slide 105 counter to the direction indicated by arrow 109, the lugs 123b, 126b move away from the projections 102a, 103a and the collars 102, 103 remain in their neutral positions until and unless the user decides to move the collar 102 and/or 103 to the one or other end position or to an intermediate position other than the neutral position.

It will be noted that the support 107 carries the slides 105, 121 and the gears 120, 122, 125. In addition, the support 107 preferably carries the optical elements 128, 129, 130, 131 and 132 of the view finder, light meter or range finder of the motion picture camera. This is desirable and advantageous since, and in view of the fact that the support 107 is mounted on the barrel 101a, all components of the zoom lens plus the means for moving the collars 102, 103 to neutral positions and the view finder can be assembled and properly adjusted before the barrel 101a is attached to the camera body. As mentioned above, the movability of slide 105 in parallelism with the optical axis 1f is desirable and advantageous because the slide 105 can be oved by the thumb, i.e., by that finger which is less likely to be necessary for manipulation of other components or elements of the camera. Consequently, other fingers of the same hand can be used while the thumb pushes the slide 105 against the opposition of the spring 106. This spring actually pulls the slide 121 downwardly, as viewed in FIG. 11 whereby the gear 120 tends to rotate the slide 105 in a direction to the right, i.e., counter to the direction indicated by arrow 109.

Figure 12:
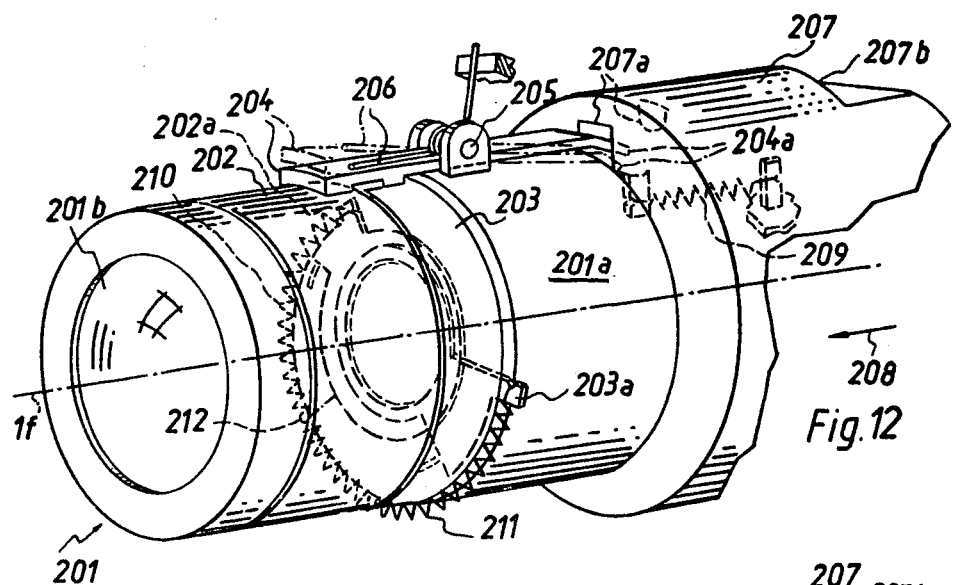
FIG. 12 is a perspective view of a further zoom lens wherein the adjusting elements are movable to neutral positions by tubular actuating means which is coaxial with the lens barrel.

FIG. 12 shows a zoom lens 201 having a barrel 201a and optical elements 201b. The collars 202 and 203 respectively correspond to the collars 2 and 3 of FIGS. 1 and 2. The barrel 201a futher carries a braking and clamping member 204 (hereinafter called shoe or brake shoe for short) which can be moved into frictional engagement with the collars 202 and 203. The shoe 204 is pivotable about the axis of a shaft 205 and is biased by a torsion spring 206 in a direction to engage the collars 202 and 203. This shoe resembles a two-armed lever one arm of which can engage the collars and the other arm of which extends rearwardly and is formed with a slightly bent rear end portion 204a receivable in a recess or socket 207a of a tubular sleeve-like actuating member 207. The member 207 is movable forwardly (arrow 208) toward an operative position against the opposition of a helical spring 209. The collars 202, 203 are coaxial with the actuating member 207 (hereinafter called sleeve).

FIG. 12 shows that the collars 202 and 203 are respectively provided with motion receiving projections 202a, 203a. These collars are movable in opposite directions, i.e., one of the collars must be rotated clockwise from an end position to thereby effect appropriate changes in focal length or to bring the image of a subject into focus, and the other collar must be rotated counterclockwise, again from an end position. The projections 202a, 203a are respectively connected with helical motion transmitting springs 201, 211 which are further connected to a retainer 212 on the barrel 201a. The force with which the shoe 204 can engage the collars 202, 203 in order to hold the collars against rotation exceeds the maximum bias of the springs 210 and 211.

In FIG. 12, the shoe 204 engages the collars 202 and 203. Therefore, when the user of the camera changes the angular position of the collar 202 or 203 against the opposition of the respective spring 210 or 211, the collar 202 or 203 remains in the newly selected angular position because the braking force of the shoe 204 cannot be overcome by the spring 210, 211, even if both springs are stressed to a maximum extent.

If the user thereupon decides to move the collars 202 and 203 to the neutral positions, the sleeve 207 is moved in the direction indicated by arrow 208. The inclined cam surface in the groove 207a engages the end portion 204a and pivots the shoe 204 against the opposition of the spring 206 whereby the shoe releases the collars 202, 203 and the springs 210, 211 are free to dissipate energy. When the collars 202 and 203 reach the aforementioned end positions, the focal length of the zoom lens 201 is set for an average value and the image of a subject is in sharp focus if the camera is held at a distance of 5 or 6 meters from the subject. When the sleeve 207 is released so that it can be moved by spring 209 back to the inoperative position of FIG. 12, the spring 206 returns the shoe 204 into frictional engagement with the collars 202 and 203 which then remain in the respective neutral positions until and unless the operator decides to move the collars 202 and/or 203 to a different angular position, i.e., to stress the spring 210 and/or 211.

Figure 13:
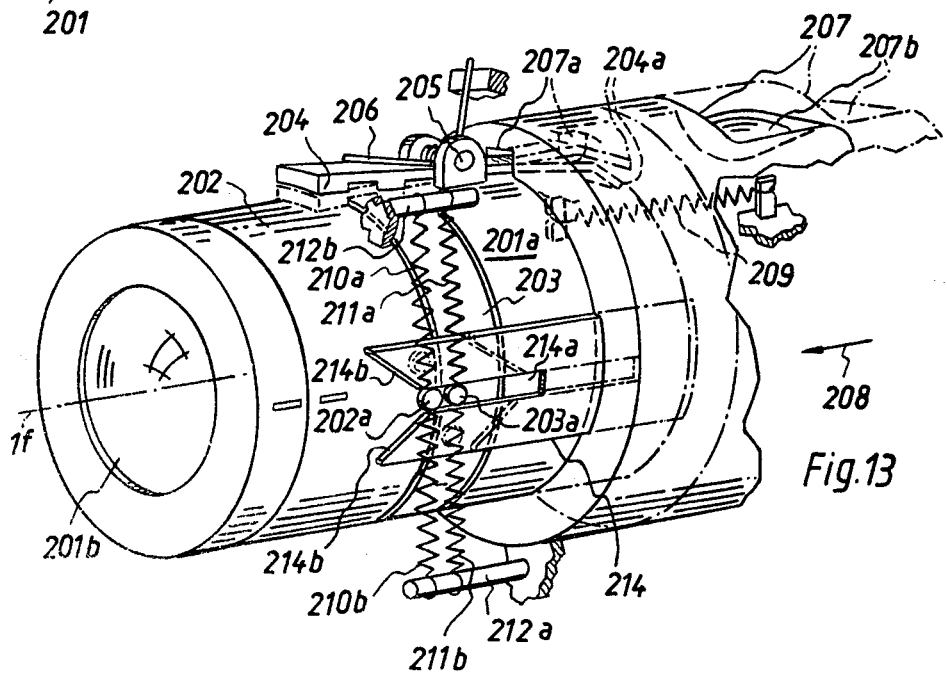
FIG. 13 is a perspective view of a modification of the zoom lens shown in FIG. 12.

The zoom lens of FIG. 13 differs from the zoom lens 201 of FIG. 12 in that each of the collars 202, 203 is biased by two motion transmitting springs acting in opposite directions. Thus, the collar 202 is biased by two helical springs 210a, 210b which are attached to the motion receiving projection 202a. The springs 210a, 210b are further respectively attached to retainers or posts 212b, 212a. Analogously, the springs 211a, 211b for the collar 203 are attached to the projection 203a, and the outer ends of these springs are respectively attached to the posts 212b, 212a. The posts 212a, 212b are mounted on the barrel 201a. The sleeve 207 has a forked extension or detent 214 with a slot 214a the outer end of which is flanked by two inclined guide faces 214b.

The inoperative position of the sleeve 207 is shown by phantom lines and the operative position is shown by solid lines. When the sleeve 207 is moved toward the operative position, the shoe 204 is disengaged from the collars 202, 203 and the springs 210a, 210b and 211a, 211b are free to move the respective collars to their neutral positions. The forked extension 214 shares the forward movement of the sleeve 207 and its inclined faces 214b guide the projections 202a, 203a into the slot 214a to thus insure that the neutral positions of the collars 202, 203 are the same in response to each forward movement of the sleeve. In other words, the extension 214 insures that the collars 202, 203 invariably assume their neutral positions as soon as the projections 202a, 203a enter the slot 214a, even if the springs 210a to 211b exhibit a tendency to move the collars back and forth to both sides of the neutral positions.

When the spring 209 is free to contract, the sleeve 207 returns to the inoperative position and the shoe 204 engages the collars 202, 203 to hold them in neutral positions. Since the braking action of the shoe 204 is stronger than the bias of the springs 210a to 211b, the operator can move the collar 202 and/or 203 from neutral position and the collar 202 and/or 203 then remains in the newly selected position.

The sleeve 207 of FIGS. 12 and 13 may be provided with a suitably configured recess 207b for insertion of a thumb which is used to move the sleeve to its operative position.

An advantage of the zoom lenses of FIGS. 12 and 13 is that the motion transmitting means (springs 210, 211 or 210a to 211b) need not be connected to the actuating member 207. This contributes to simplicity of such motion transmitting means. All the actuating member 207 has to do is to disengage the shoe 204 from the collars 202, 203 whereby the springs automatically move both collars to neutral positions (unless the one or the other collar has been moved to neutral position prior to movement of actuating member 207 to the operative position).

Another advantage of the zoom lenses of FIGS. 12 and 13 is that the shoe 204 normally bears against the two collars to that the collars remain in selected angular positions with a higher degree of reliability than if such selected positions were maintained solely as a result of frictional engagement between the collars and the barrel. This is achieved by increasing the force which is necessary to change the angular positions of the collars because such force must overcome the friction between the shoe 204 and the collars as well as the resistance of the springs 210, 211 or 210a to 211b.

Figure 14:
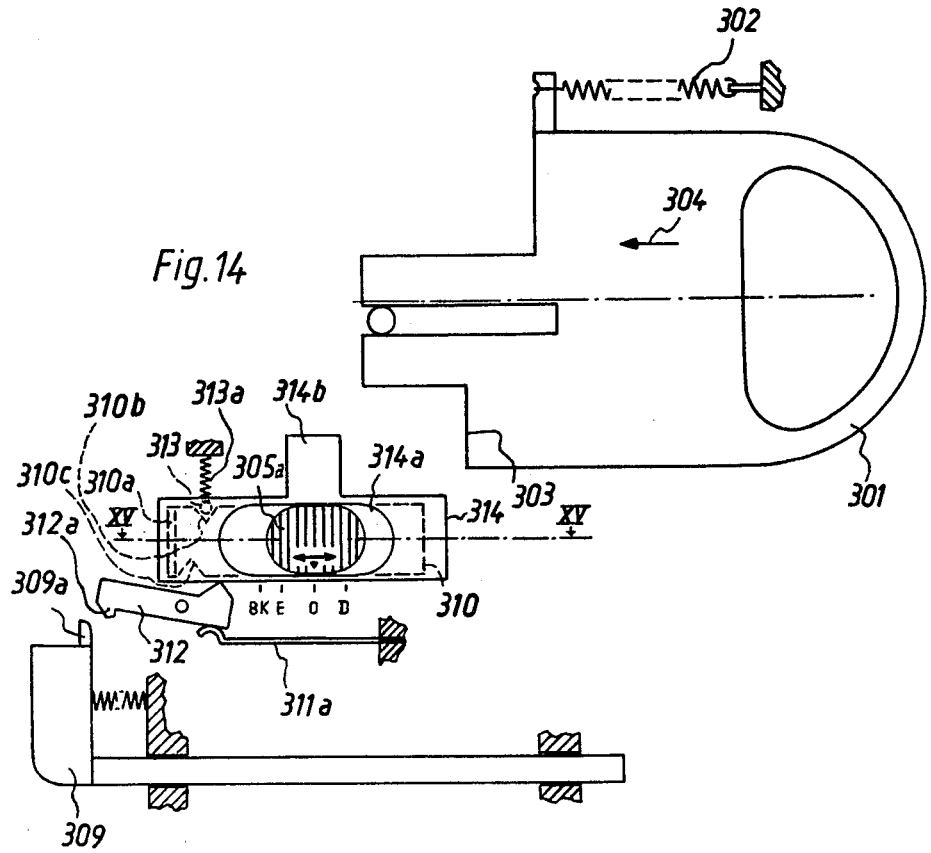
FIG. 14 is a fragmentary diagrammatic view of a motion picture camera wherein the actuating means for the adjusting elements of the zoom lens further serves to close a master switch simultaneously with movement of adjusting elements to neutral positions.
Figure 15:
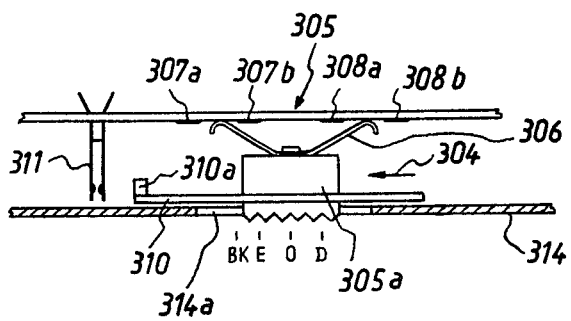
FIG. 15 is a fragmentary sectional view substantially as seen in the direction of arrows from the line XV—XV of FIG. 14.

Referring finally to FIGS. 14 and 15, there is shown a portion of a further motion picture camera which comprises a battery-operated motor (not shown) for film transport and/or for the zoom lens (not shown). FIG. 14 merely shows an actuating member 301 which is assumed to correspond to the actuating member 105 of FIG. 11 and is biased to inoperative position by a helical spring 302. The manner in which the movement of actuating member 301 to operative position results in movement of collars on the barrel of the zoom lens to neutral positions is the same as described in connection with FIG. 11. When the actuating member 301 dwells in the inoperative position of FIG. 14, the collars on the barrel can be rotated with or relative to each other between two spaced-apart end positions and to any one of a practically unlimited number of intermediate positions (including one or more neutral positions). The actuating member has an entraining shoulder 303 and is reciprocable (in and counter to the direction indicated by arrow 304) in parallelism with the optical axis of the zoom lens. It is clear, however, that the actuating member 301 can be mounted for movement at an angle to the optical axis, for example, tangentially of the barrel in a manner similar to that shown in FIGS. 1 to 10.

The motion picture camera comprises a so-called master switch 305 which must be closed prior to actuation of the release trigger 309 in order to enable the motor to transport the film and/or to change the focal length of the zoom lens. The master switch 305 should normally remain open to avoid premature exhaustion of the battery, batteries or other source or sources of electrical energy for the motor or motors of the motion picture camera. As shown in FIG. 15, the master switch 305 comprises a slidable handgrip member or knob 305a whose front face is serrated and which extends from or is accessible in the camera body. The knob 305a is movable in and counter to the direction indicated by arrow 304. When the knob 305a is moved to the "O" position, the master switch 305 is open to prevent gradual exhaustion of one or more batteries, not shown. In such "O" position of the knob 305a, a springy contact 306 of the master switch 305 does not engage any of the four terminals 307a, 307b, 308a, 308b of the master switch. These terminals are connected in the electric circuit of the camera. The terminals 207a, 307b and 308a, 308b are respectively in parallel with each other and in series with the motor switch (not shown). The motor switch is closed in response to actuation of the camera release 309, i.e., in response to movement of such release counter to the direction indicated by arrow 304.

The knob 305a of the master switch 305 is movable from the "O" position to a position "E" (by moving in the direction indicated by arrow 304) in which the circuit is completed because the two arms of the springy contact 306 engage the terminals 307a, 308a. Still further, the knob 305a is movable (in the direction indicated by arrow 304) to a position "BK" in which a pointer (not shown) or the like assumes a position which is indicative of the charge of the batteries. To this end, the knob 305a is connected with an elongated trip 310 having a bent-over front portion or lug 310a which closes a battery check switch 311 when the knob assumes the position "BK".

The knob 305a of the master switch 305 is further movable to a position "D" (the knob reaches such position by moving from the position "BK", "E" or "O" counter to the direction indicated by arrow 304) in which the arms of the springy contact 206 engage the terminals 307b and 308b to complete the corresponding part of the electrical circuit of the camera. When the knob 305a assumes the position "D", a pawl 312 (which is biased by a leaf spring 311a or the like) can enter a notch 310c of the trip 310 whereby a projection 312a of the pawl 312 engages a complementary projection 309a of the release 309 and maintains the latter in depressed position so that the camera can make a series of exposures, even if the finger pressure upon the release 309 is relaxed or terminated.

A detent 313 (e.g., a sphere) is preferably provided to yieldably hold the knob 305a in the position "O". To this end, the detent 313 is biased by a spring 313a and penetrates into a suitably configurated notch 310b of the trip 310 when the knob 305a reaches the "O" position.

The knob 305a of the master switch 305 is received in an elongated slot 314a of a motion transmitting slide 314 which is reciprocable in and counter to the direction indicated by arrow 304. The slide 314 has an extension 314b which is located in the path of movement of the shoulder 303 on actuating member 301. The length of the slot 314a is such that the knob 305a can be moved by hand relative to the slide 314, i.e., that the user of the camera can move the knob 305a to any of the positions "O", "D", "E" and "BK". However, the extent to which the actuating member 301 can move the slide 314 when the collars on the barrel are to be moved to neutral positions is always sufficient to move the knob 305a to the position "BK" when the actuating member 301 reaches its operative position. Thus, the slide 314 automatically moves the knob 305a from the position "D", "O" or "E" and all the way to the position "BK" whenever the user of the camera decides to move the collars for focusing and focal length adjustment to their neutral positions. This enables the user to check the condition of batteries whenever the actuating member 301 reaches its operative position. When the actuating member 301 reaches the operative position, the trip 310 not only closes the battery check switch 311 but also stresses the elastic contacts of the switch 311, i.e., such contacts store energy and move the knob 305a to the position "E" as soon as the spring 302 is free to dissipate energy in order to return the actuating member 301 to the inoperative position of FIG. 14. Consequently, the master switch 305 is closed in automatic response to movement of the actuating member from inoperative position to operative position and back to inoperative position so that the user can start with the making of exposures by the simple expedient of depressing the release 309. Such exposures are made while the collars assume their neutral positions unless, of course, the user has decided to change the position of the one and/or the other collar prior to depression of the release.

An important advantage of the camera which embodies the structure of FIGS. 14 and 15 is that the camera is invariably ready for the making of exposures when the collars on the barrel of the zoom lens are caused to assume their neutral positions in response to movement of actuating member 301 to operative position. This insures that an unskilled photographer who is not familiar with the purpose and/or art of focussing and/or zooming can make exposures of acceptable quality under different circumstances by the simple expedient of shifting the actuating member 301 against the opposition of the spring 302 and by thereupon permitting the spring 302 to return the actuating member to inoperative position. The slide 314 constitutes but one form of motion transmitting means which can be used to move the knob 305a to the position "BK" in response to movement of the actuating member 301 against the opposition of the spring 302. Such slide can be replaced by one or more levers, a gear trian, a system of cables or any other motion transmitting means which can insure that the master switch 305 is closed not later than when the actuating member reassumes its inoperative position.

If the camera does not have a battery check switch, the elastic contacts of the switch 311 shown in FIG. 15 are replaced by a spring (not shown) which is stressed when the actuating member 301 reaches its operative position and which thereupon dissipates energy to move the knob 305a to the position "E". Alternatively, and especially in the absence of a battery checking device, the movement of actuating member 301 can result in movement of the knob 305a to the position "E" as soon as the member 301 reaches its operative position.

The switch 305 may constitute (or be replaced by) a selector switch, e.g., a switch which selects the motor speed.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. In a photographic apparatus, particularly in a motion picture camera, a combination comprising a variable focal length lens; means for adjusting the focal length of said lens, said adjusting means being movable between a plurality of positions including at least one neutral position corresponding to a predetermined focal length; at least one additional adjusting means movable between a plurality of positions including at least one neutral position, said additional adjusting means including focusing means for said lens; actuating means movable between operative and inoperative positions; and motion transmitting means for simultaneously moving both said adjusting means to the respective neutral positions in response to movement of said actuating means between said operative and inoperative positions, irrespective of the position of either of said adjusting means prior to such movement of said actuating means.

2. A combination as defined in claim 1, wherein each of said adjusting means is movable between two spaced-apart end positions and through a plurality of intermediate positions, the neutral positions of said adjusting means corresponding to predetermined intermediate positions thereof in which the focal length of said lens is a median focal length in the neutral position of said first mentioned adjusting means and the image of a subject is accurately focused on an unexposed film frame of the photographic apparatus in the neutral position of said additional adjusting means when the camera is located at a median distance from the subject between closeup and infinity.

3. A combination as defined in claim 2, wherein said motion transmitting means comprises two motion transmitting members which are spaced apart from each other in the inoperative position of said actuating means and means for moving said motion transmitting members toward each other in response to movement of said actuating means to said operative position, said motion transmitting members having entraining portions and said adjusting means having motion receiving portions located between said entraining portions in each and every position of said adjusting means so that said motion receiving portions are invariably engaged and moved by said entraining portions on movement of said actuating means to said operative position, except when the respective adjusting means assumes its neutral position prior to such movement of said actuating means.

4. A combination as defined in claim 3, further comprising means for biasing said actuating means to said inoperative position.

5. A combination as defined in claim 3, wherein said motion transmitting members are pivotable levers and said means for moving said motion transmitting members comprises at least one gear.

6. A combination as defined in claim 3, wherein said motion transmitting members are reciprocable toward and away from each other and said means for moving said motion transmitting members comprising at least one gear.

7. A combination as defined in claim 6, wherein one of said motion transmitting members is provided on said actuating means and the other of said motion transmitting members is a slide, said actuating means and said slide having toothed racks and said gear being in mesh with said racks.

8. A combination as defined in claim 2, wherein said motion transmitting means comprises two coaxial rotary members having entraining portions which are spaced apart from each other in the inoperative position of said actuating means and said adjusting means comprise motion receiving portions located between said entraining portions in each and every position of said adjusting means, said motion transmitting means further comprising means for moving said rotary members in opposite directions to thereby move said entraining portions toward each other in response to movement of said actuating means to said operative position.

9. A combination as defined in claim 8, wherein said adjusting means are rotatable between said positions thereof about the common axis of said rotary members.

10. A combination as defined in claim 8, wherein said rotary members have gear teeth and said means for moving said rotary members includes a toothed rack on said actuating means and a train of gears connecting said rack with said gear teeth.

11. A combination as defined in claim 2, wherein said motion transmitting means comprises a mobile driving member receiving motion from said actuating means, first and second gears for respectively moving said first mentioned and said additional adjusting means, at least one third gear rotatable by said driving member, first and second clutch means respectively interposed between said first and second gears and said second and third gears, and means for biasing said driving member to a predetermined position in which said member assumes during movement of said actuating means to said inoperative position and which corresponds to the neutral positions of said adjusting means.

12. A combination as defined in claim 11, wherein said driving member comprises a toothed rack in mesh with said third gear during movement of said actuating means to said operative position and during the initial stage of return movement of said actuating means to said inoperative position, and means for disengaging said rack from said third gear during the remaining stage of movement of said actuating means to said inoperative position.

13. A combination as defined in claim 12, wherein said adjusting means are rotatable between said positions thereof and comprise ring gears each in mesh with a different one of said first and second gears.

14. A combination as defined in claim 12, further comprising coupling means controlled by said actuating means and operative to maintain said driving member in motion transmitting engagement with said third gear as well as to arrest said driving member in said predetermined position during movement of said actuating means to said inoperative position.

15. A combination as defined in claim 12, further comprising a fourth gear coaxial with said third gear, said driving member being movable into engagement with said third and fourth gear and the extent to which said adjusting means are moved when said driving member engages said third gear being different from the extent of movement of said adjusting means when said driving member engages said fourth gear.

16. A combination as defined in claim 12, wherein said disengaging means comprises a spring and said driving member is pivotable about a predetermined axis to move said rack into and from mesh with said third gear.

17. A combination as defined in claim 16, further comprising a mobile coupling member arranged to normally maintain said rack in mesh with said third gear, said actuating means comprising means for disengaging said coupling member from said driving member upon completion of said first stage of return movement of said actuating means from said operative position so that said spring is thereupon free to disengage said rack from said third gear.

18. A combination as defined in claim 17, wherein said coupling member is a lever which is pivotable about a fixed axis and said last mentioned disengaging means comprises a cam provided on said actuating means and being disengaged from said lever in the inoperative position of said actuating means, and further comprising means for biasing said lever into engagement with said driving member.

19. A combination as defined in claim 2, wherein said motion transmitting means comprises flexible elements coupled to said adjusting means and means for moving said flexible elements lengthwise in response to movement of said actuating means to said operative position thereof.

20. A combination as defined in claim 19, wherein said means for moving said flexible elements comprises rotary members and one-way clutches interposed between said rotary members.

21. A combination as defined in claim 20, wherein said actuating means is rotatable between said positions thereof and further comprising means for biasing said actuating means to said inoperative position, said clutches being operative to effect the movement of said flexible elements in response to rotation of said actuating means to operative position.

22. A combination as defined in claim 21, wherein said flexible elements are of finite length each having an end secured to the respective adjusting means and further comprising guide means around which said flexible elements are trained intermediate said ends thereof and said rotary members.

23. A combination as defined in claim 19, further comprising detent means for yieldably holding said adjusting means in the respective neutral positions.

24. A combination as defined in claim 2, wherein said motion transmitting means comprises a reciprocable motion transmitting member and a rotary motion transmitting member.

25. A combination as defined in claim 24, wherein said reciprocable motion transmitting member is rigid with said actuating means.

26. A combination as defined in claim 1, wherein said actuating means is movable between said operative and inoperative positions at an angle to the optical axis of said lens.

27. A combination as defined in claim 1, wherein said actuating means is movable in parallelism with the optical axis of said lens.

28. A combination as defined in claim 27, wherein each of said adjusting means is movable between two spaced-apart end positions and through a plurality of intermediate positions, the neutral positions of said adjusting means corresponding to predetermined intermediate positions thereof so that the focal length of said lens is a median focal length in the neutral position of said first mentioned adjusting means and the image of a subject is accurately focused on an unexposed film frame of the photographic apparatus in the neutral position of said additional adjusting means when the camera is located at a median distance from the subject between closeup and infinity.

29. A combination as defined in claim 28, wherein said adjusting means comprise motion receiving portions and said motion transmitting means comprises two motion transmitting members having entraining portions, said motion receiving portions being located between said entraining portions in the inoperative position of said actuating means and said entraining portions engaging and entraining said motion receiving portions in response to movement of said actuating means to said operative position.

30. A combination as defined in claim 29, wherein said motion transmitting means further comprises a toothed rack movable with said actuating means and a train of gears interposed between said rack and said motion transmitting members.

31. A combination as defined in claim 29, further comprising a support for said train of gears, said lens having a barrel connected with said support.

32. A combination as defined in claim 31, further comprising a system of optical elements mounted on said support.

33. A combination as defined in claim 32, wherein said optical elements form part of a view finder.

34. A combination as defined in claim 1, wherein each of said adjusting means includes motion receiving means operatively connected with said motion transmitting means, and further comprising braking means for normally holding said adjusting means in selected positions including said neutral positions and means for disengaging said braking means from said adjusting means in response to movement of said actuating means from said inoperative position.

35. A combination as defined in claim 34, wherein said disengaging means forms part of said actuating means.

36. A combination as defined in claim 34, wherein said motion transmitting means includes resilient means and the braking action of said braking means is more pronounced than the bias of said resilient means upon said adjusting means so that said resilient means can move said adjusting means only when said braking means is disengaged from said adjusting means.

37. A combination as defined in claim 36, wherein each of said adjusting means is movable between two end positions and through a plurality of intermediate positions, said neutral positions corresponding to predetermined intermediate positions of the respective adjusting means and said resilient means comprising a pair of springs for each of said adjusting means, said pairs of springs being arranged to move the respective adjusting means to the corresponding neutral positions in response to disengagement of said braking means from said adjusting means.

38. A combination as defined in claim 37, wherein said adjusting means are rotatable between said end positions thereof and the springs of each of said pairs are arranged to respectively bias the corresponding adjusting means in clockwise and counterclockwise directions.

39. A combination as defined in claim 36, wherein each of said adjusting means is movable between two end positions one of which is the respective neutral position, said resilient means comprising springs which bias said adjusting means to the respective end positions.

40. A combination as defined in claim 39, wherein said adjusting means are rotatable in opposite directions from said neutral positions thereof and comprise motion receiving portions connected with the respective springs, and further comprising common retainer means for all of said springs.

41. A combination as defined in claim 36, wherein said adjusting means comprise motion receiving portions connected with said resilient means and said actuating means comprises detent means for said motion receiving portions, said motion receiving portions being engaged by said detent means in the operative position of said actuating means.

42. A combination as defined in claim 41, wherein said actuating means is movable in parallelism with the optical axis of said lens and said detent means comprises a fork provided on said actuating means and defining a slot for said motion receiving portions.

43. A combination as defined in claim 42, wherein said fork further comprises guide faces along which said motion receiving portions move into said slot during movement of said actuating means to said operative position.

44. A combination as defined in claim 1, further comprising a source of electrical energy, switch means in circuit with said source, and means for closing said switch means in response to movement of said actuating means to said operative position.

45. A combination as defined in claim 44, wherein said closing means is provided on said actuating means.

46. A combination as defined in claim 44, wherein said closing means comprises a slide which receives motion from said actuating means during movement of said actuating means between said positions thereof.

47. A combination as defined in claim 44, wherein said closing means comprises a member which is pivoted by said actuating means during movement of said actuating means between said positions thereof.

48. A combination as defined in claim 44, wherein said switch means includes contact means movable between a plurality of positions including a first position in which said switch means is closed and a second position, said closing means including means for moving said contact means to said second position in response to movement of said actuating means to said operative position and means for automatically moving said contact means from said second to said first position in response to movement of said actuating means from said operative position.

49. A combination as defined in claim 48, wherein said means for moving said contact means from said second to said first position includes at least one resilient element.

50. A combination as defined in claim 48, further comprising means for checking the condition of said energy source, said condition checking means being rendered operative by said switch means in said second position of said contact means.

51. A combination as defined in claim 48, wherein said actuating means and said contact means are movable in parallelism with the optical axis of said lens.

52. A combination as defined in claim 44, wherein said closing means comprises an entraining portion provided on said actuating means and a motion transmitting element interposed between said entraining portion and said switch means to close said switch means in response to movement of said actuating means from said inoperative position.

53. A combination as defined in claim 52, wherein said switch means comprises a contact which is movable with respect to said element in the inoperative position of said actuating means.

54. A combination as defined in claim 53, wherein said switch means further comprises a knob connected with said contact and said element has an elongated slot through which said knob extends.

55. A combination as defined in claim 44, wherein said switch means comprises contact means movable between a plurality of positions including at least one closed position which said contact means assumes not later than upon completion of movement of said actuating means from said inoperative position to said operative position and back to said inoperative position.

56. A combination as defined in claim 44, wherein said switch means comprises contact means movable between a plurality of positions including at least one closed position which said contact means assumes not later than upon completion of movement of said actuating means from said inoperative position to said operative position and back to said inoperative position, and further comprising detent means for yieldably holding said contact means in at least one of said positions thereof.

* * * * *